United States Patent
Grosman et al.

(10) Patent No.: US 12,032,592 B2
(45) Date of Patent: Jul. 9, 2024

(54) METHOD, DATABASE HOST, AND MEDIUM FOR DATABASE B-TREE BRANCH LOCKING

(71) Applicants: Ronen Grosman, Markham (CA); Sherman Lau, Markham (CA); Tian Chen Gu, Markam (CA); Kristian Robert Lejao, Mississauga (CA)

(72) Inventors: Ronen Grosman, Markham (CA); Sherman Lau, Markham (CA); Tian Chen Gu, Markam (CA); Kristian Robert Lejao, Mississauga (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 17/877,649

(22) Filed: Jul. 29, 2022

(65) Prior Publication Data

US 2024/0037118 A1 Feb. 1, 2024

(51) Int. Cl.
*G06F 16/27* (2019.01)
*G06F 16/22* (2019.01)
*G06F 16/23* (2019.01)

(52) U.S. Cl.
CPC .......... *G06F 16/27* (2019.01); *G06F 16/2246* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 8,086,579 B1* | 12/2011 | Chandrasekaran | G06F 16/2343 707/703 |
| 2006/0004758 A1* | 1/2006 | Teng | G06F 16/2343 707/999.009 |
| 2010/0146003 A1* | 6/2010 | Bruso | G06F 16/2246 707/E17.044 |
| 2013/0204902 A1* | 8/2013 | Wang | G06F 16/2365 707/E17.012 |
| 2014/0074841 A1* | 3/2014 | Majnemer | G06F 16/2246 707/E17.002 |
| 2021/0303196 A1* | 9/2021 | Lv | G06F 3/0679 |
| 2022/0138175 A1* | 5/2022 | Mahendra Kumar | G06F 16/2365 707/694 |
| 2022/0261386 A1* | 8/2022 | Negi | G06F 16/2343 |
| 2022/0318218 A1* | 10/2022 | Lin | G06F 16/2246 |

* cited by examiner

*Primary Examiner* — Irene Baker (57) ABSTRACT

Methods, systems, and computer-readable media are described in which WAL records are replayed serially at the database sub-object level, thereby enabling parallelism for processes affecting a single database object without interfering with the consistency required to maintain ROS capability. WAL records are replayed serially at the B-Tree branch level, instead of existing approaches which serialize WAL record replay at the object or block level. Described examples may thereby enable multi-block operations (e.g., SPLIT) within the same B-Tree branch to be replayed in the correct sequence, thereby maintaining consistent reads during ROS. Multi-level dispatching at the object and sub-object levels may be used to minimize delays caused by operations affecting multiple branches of a database object.

20 Claims, 7 Drawing Sheets

METHOD, DATABASE HOST, AND MEDIUM FOR DATABASE B-TREE BRANCH LOCKING

FIELD

The present disclosure relates to distributed database management and in particular to methods, systems, and processor-readable media for synchronizing data between a database master server and a database replica server.

BACKGROUND

Database services are used for storing, retrieving, and modifying data. Database services are often provided over a network using a distributed database system, in which the data stored by a database master server (also called a primary database host) is replicated by one or more database replica servers (also called standby hosts), in order to provide desirable characteristics of the database service such as data backup, data redundancy, parallel read access, and so on. In some distributed database systems, the database may be modified (e.g., use a write operation to modify data) by multiple different entities (e.g., multiple different master database servers).

Most modern distributed database systems use a technique called Write Ahead Logging (WAL) to reconcile and synchronize data between the database master server(s) and the database replica server(s). In WAL, data records encoding recent database transactions that have been performed on a database master server (called WAL records, redo log records, or XLOG records) are sent from the database master server to a database replica server to allow the database replica server to update the state of its own replica of the database. The WAL records are recorded in a write ahead log (also called a redo log), and the log is written to stable storage before the transactions are executed to change the database. WAL thereby provides the properties of atomicity and durability to the distributed database system.

Thus, the write ahead log contains information describing a history of all changes made to the contents of a database, which may be used to reconstruct contents of the database (e.g., in the event of a failure). The WAL records may also be used to ensure that replicas of the database correctly reflect the data contained in the original (or master) database.

High availability is a desirable characteristic of a distributed database system. A high availability system aims to maximize system availability. A high availability instance of a distributed database system usually consists of (1) a primary database host (i.e., a database master server) to which clients connect and perform data manipulation language (DML) operations such as Insert, Update, Delete (i.e. write operations on the database); and (2) at least one standby database host (i.e., a database replica server) that replays WAL records received from the primary database host generated from DML operations. The standby database host replays the WAL records in order to take over from the primary database host in circumstances when the primary database host becomes unavailable (e.g., due to a system crash or connectivity problem), thereby minimizing the downtime of the entire distributed database system. A typical performance metric used to measure availability is Recovery Time Objective (RTO), which denotes a duration of time and a service level within which a service must be restored after a disaster.

Some high availability distributed database systems also enable a mode of operation called Read-On-Standby (ROS). ROS is a mode in a high availability distributed database system wherein the database replica on the standby database host is maintained to be consistent with the database master, such that clients can safely perform read operations directly on the replica database. This means that client connections are allowed to submit SELECT queries to the standby database host while the standby database host is receiving and replaying WAL records from the primary database host.

High availability distributed database systems currently use one of two existing approaches to replaying WAL records: "per object" replay and "per block" replay. The first approach performs serial WAL record replay at the database object level; the second approach performs serial WAL record replay at the database block level. A database object is typically a stand-alone object in a database, such as a single database table.

In "per object" replay, although the standby database host uses multiple threads to replay multiple WAL records at a time, it serializes replay at the database object level. For instance, consider an example database with one table (i.e. one object), table T1, and having 100 blocks of data in table T1. In this example, all WAL records applicable to Table T1 are executed serially by a single replaying thread or process. Serial execution at the object level ensures consistency during ROS (i.e., SELECT queries on the standby database host are guaranteed correct results) because it maintains the validity of both tables and indexes by replaying all WAL records within each relation object in sequence.

In a typical "per object" replay approach, a dispatcher (i.e., a process that runs on the standby database host) reads WAL records and dispatches the WAL records to a worker thread, which replays the record. All WAL records that belong to the same database object (e.g., Table T1, Index I1) are dispatched to the same worker thread. Whereas such an approach may use a separate worker thread for each database object, and the worker threads can operate in parallel, no parallelism is possible with respect to WAL records applying to the same database object.

In contrast, the "per page" approach serially replays WAL records at the block level. It uses a multi-level queue approach to first dispatch WAL records by object, before it dispatches the per-object WAL records by block number. This allows the "per page" approach to achieve higher parallelism and thereby achieve improved performance (i.e. shorter RTO), because it can have multiple replay threads running in parallel per database object.

However, the "per page" approach does not achieve the consistency needed for ROS if a B-Tree index is used to index any of the database's objects. A B-Tree is an indexing access technique widely adopted in Database Management Systems (DBMS). B-Tree indexing helps tuple reading by constructing a self-balancing search tree that leads to an efficient tuple retrieval in contrast to the conventional approach of sequential scanning. A B-Tree "branch" or "subtree" is a smaller B-Tree depending from a root node of a parent B-Tree. The root node of a B-Tree includes pointers to two or more subtrees, each subtree corresponding to an index value range.

Consider a simple B-Tree having three subtrees denoted by keys 2, 30, and 68 respectively. The three subtrees thus correspond to index value ranges [2 to 29], [30 to 67], and [68 and higher]. An operation request is received, having a key of 27. The search starts with the root node, and the indexing process need to determine to which of the child nodes (and therefore subtrees) to descend. Because $2 \leq 27 < 30$, the indexing process determines that the first child node should be traversed. Each node of each subtree similarly has one or more keys, and the same process is repeated recursively until the indexing process reaches a leaf node mapped to key 27.

In order to support ROS, the tree structure of the B-Tree needs to be maintained at each point in time while WAL records are being replayed. This means that any path from the root node to any leaf node needs to be valid during any B-Tree index scan. In the "per object" replay approach described above, all WAL records applicable to the same B-Tree (i.e., to a B-Tree indexing a single object) are replayed in a serialized manner. This ensures consistency during ROS, because the entire B-Tree is always valid. However, in the "per page" replay approach described above, multiple WAL records applicable to different blocks indexed by a single B-Tree are replayed in parallel. This potentially results in inconsistency during ROS, caused by certain B-Tree operations such as SPLIT (wherein a data block encoding a node of the B-Tree is split into two blocks). Serializing WAL record replay by block number does not guarantee that a WAL record modifying a leaf node will be replayed first before a WAL record modifying a parent node of the leaf node, thereby potentially resulting in an inconsistent path from the root node to the leaf node.

Accordingly, it would be useful to provide a way of applying WAL records to synchronize data at a database replica that overcomes one or more of the limitations of existing approaches identified above.

SUMMARY

The present disclosure describes example methods, systems, and computer-readable media in which WAL records are replayed at the database sub-object level, thereby enabling parallelism for processes affecting a single database object without interfering with the consistency required to maintain ROS capability. Thus, examples described herein may provide a technical solution to the technical problem presented by existing replay approaches, wherein WAL record replay on a standby database host is either slow with consistent ROS (e.g., "per object" approaches), or fast but with inconsistent ROS (e.g., "per block" approaches), by providing a new approach that provides higher concurrency than the "per object" replay approach while supporting ROS consistency that the "per block" replay approach cannot. Some embodiments described herein may thereby reduce the time between when a WAL record is generated and sent from a primary database host and when the WAL record is received and replayed on the standby database host, while maintaining consistent ROS. Reducing this time is important for two separate reasons: first, it potentially reduces the recovery time of a database system after a primary database host becomes unresponsive, and second, it potentially enables ROS queries to return more up-to-date records.

In some examples described herein, WAL records are replayed serially at the B-Tree branch level instead of existing approaches which serialize WAL record replay at the object or block level. Described examples may thereby enable multi-block operations (e.g., SPLIT) within the same B-Tree branch to be replayed in the correct sequence, thereby maintaining consistent reads during ROS. Each ROS read is consistent because the logic ensures that all branches in the B-Tree remain consistent while WAL records are being received and replayed. If an index scan is executed which traverses the B-Tree from the root node and descends into a particular branch, the system ensures that the branch is consistent at each point in time because the replay of all WAL records applicable to the branch is synchronous.

Furthermore, replaying WAL records by B-Tree branch not only allows higher concurrency than "per object" approaches (because multiple threads can replay WAL records belonging to one database object), but some embodiments described herein also improve speed of replay by using multi-level dispatching to enable queue locking at the sub-object level while also performing global synchronization at the object level. For operations that require the replay of WAL records pertaining to a given database object to pause in order for replay worker threads to synchronize, only the replay worker threads pertaining to the database object in question are required to pause, instead of all replay workers. Thus, replay operations may continue on database objects that are unaffected by the operation.

Some terminology that will be used in the present disclosure is now discussed.

As used herein, the term "database" is used to refer to an organized collection of data, generally stored and accessed electronically from a computer system.

Figure 1:
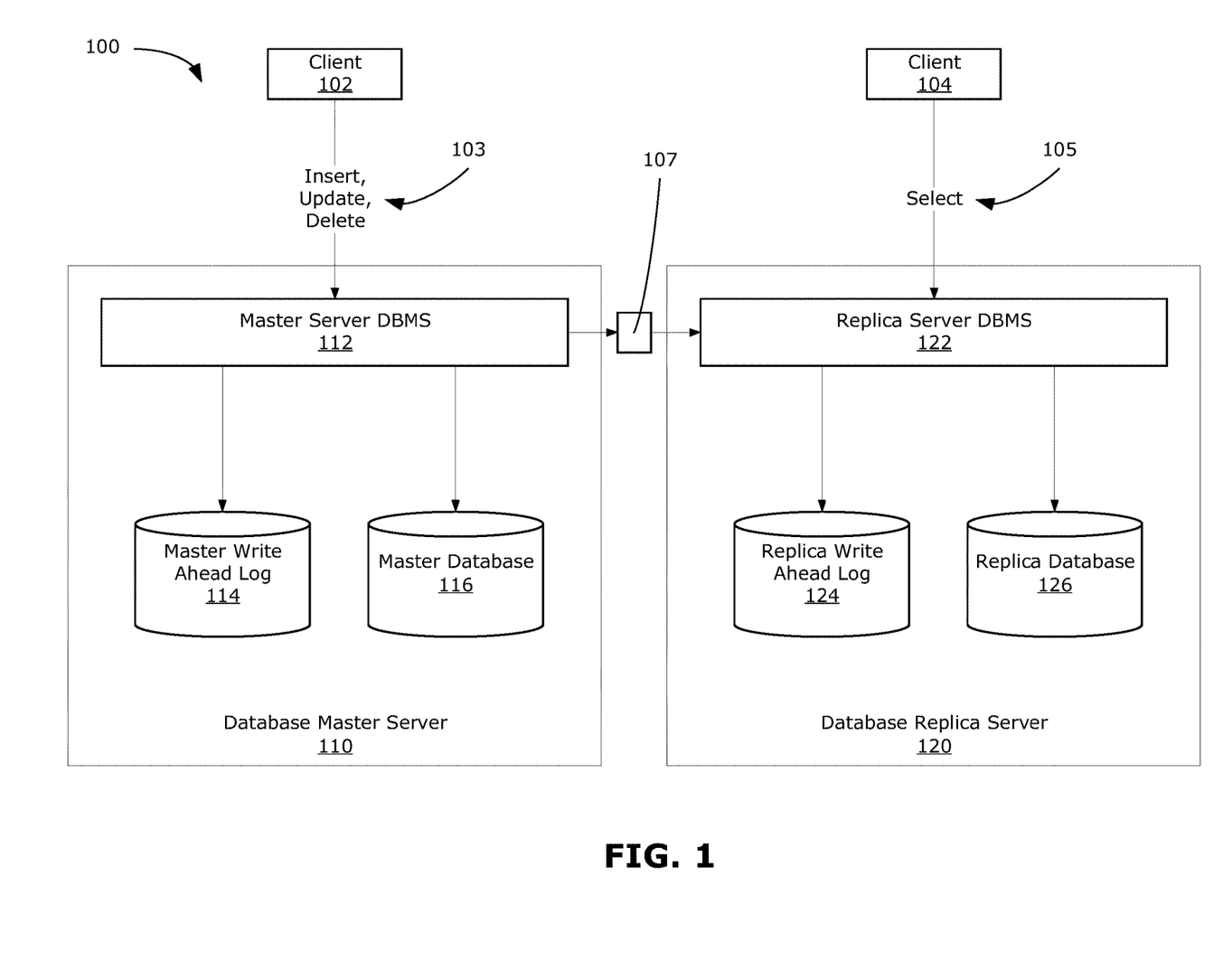
FIG. 1 is a logical block diagram schematically illustrating a simplified distributed database system that can deliver database services, in accordance with example embodiments described herein.

A Database Management System (DBMS) is a "software system" that enables a user (e.g., database administrator) to define, create, maintain and control access to a database. The DBMS is the "software" that interacts with end users through clients 102, 104, and the database itself to capture and analyze the data. The DBMS acronym is sometime extended to indicate the underlying database model, such as RDBMS for relational database model, OODBMS or ORDBMS for object (orientated) database model, and ORDBMS for object-relational database model. Other extensions can indicate some other characteristic, such as DDBMS for a distributed database management system. The core functionality provided by a DBMS is the storage, retrieval and update of data. A fully-fledged general purpose DBMS generally provides the following functionalities:

Data storage, retrieval and update
User accessible catalog or data dictionary describing the metadata
Support for transactions and concurrency
Facilities for recovering the database should it become damaged
Support for authorization of access and update of data
Access support from remote locations
Enforcing constraints to ensure data in the database abides by certain rules A database engine (or storage engine) is the underlying software component that a DBMS uses to create, read, update and delete (CRUD) data from a database. External interaction with the database may be via application programs that interface with the DBMS, examples of which are shown in FIG. 1 as client 102 and client 104.

A database transaction (also simply referred to as transaction) is a unit of work performed within a DBMS.

As used herein, the term "database object" is used to refer to an object stored as part of a database, such as a database table or a database index.

Database blocks (or simply referred to as blocks) are the internal basic structure to organize the data in the database files. A database block is a unit of storage whose size may be configurable on a system-wide, database-wide, or conglomerate-specific basis. A block may be identified by identifier(s), such as a block identifier and space identifier. For the purposes of the present disclosure, the terms "block" and "page" are used interchangeably to refer to a data block or data page of a database. A database object typically comprises multiple blocks or pages.

As used herein, the term "WAL" may refer to either a technique, Write Ahead Logging, or a data object used by the technique, a Write Ahead Log.

A write ahead log (WAL), also called a redo log or more generally a database log, is a file which logs a history of all changes made to the database. A WAL may be stored as a file. Each WAL contains one or more WAL records, also called redo log records, XLOG records, or more generally database log records or log entries. In some examples, a WAL record holds a group of change vectors, each of which describes or represents a change made to a single block or page in the database.

The terms "redo log" and "XLOG" may stem from specific DBMS models, however these terms may also be used herein in a generic manner, to refer to a WAL or database log. MySQL™ is an example database model that uses the term "redo log"; MySQL™ is an example database model that may be used to implement examples described herein. Similarly, PostgresSQL™ is an example database model that uses the term "XLOG"; PostgresSQL™ is another example database model that may be used to implement examples described herein. It should be understood that the present disclosure may be equally applicable to other database models. Thus, as used herein, the terms "WAL record", "redo log record", and "XLOG record" are used interchangeably to refer to a write ahead log record.

A WAL record may include further information, such as block identification information identifying the block to which the WAL record is applicable. In some embodiments, the block identification information may include a block identifier (ID) and a space ID. A WAL record may also include a sequence number, such as a log sequence number (LSN), indicating the location of the WAL record within the WAL.

A database model is a type of data model that determine a logical structure of the database and determines in which manner data can be stored, organized, and manipulated. An example of a database model is the relational model, which uses a table based format to store, organize, and manipulate data.

As used herein, the term "B-Tree" is used to refer to a self-balancing tree data structure that maintains sorted data and allows searches, sequential access, insertions, and deletions in logarithmic time. A B-tree is a more generalized version of a binary search tree, allowing for nodes with more than two children. B-Trees may be used to efficiently index the blocks of a database object.

As used herein, the terms "branch" and "subtree" are used interchangeably to refer to a subtree of a B-Tree depending from the root node of the B-Tree.

As used herein in the context of WAL records, the terms "apply" or "application" may be used in context to mean a process by which one or more data blocks of a database, or one or more data objects of the database, are altered or updated using the contents of a WAL record. One or more WAL records may be applied to an out-of-date version of the data block(s) or database object(s) to update the contents of the data block(s) or database object(s) to reflect the changes to database content recorded in the WAL record(s).

As used herein, the terms "database master server" and "primary database host" are used interchangeably to refer to a server or other node in a distributed database system that is configured to handle modifications to the database including requests to insert, update, or delete database records. The term "database replica server" and "standby database host" are used interchangeably to refer to a server or other node in the distributed database system that is configured to handle only read requests, e.g., requests to select database records. Database replica servers may maintain replicas of some or all of the data blocks of the database based on WAL records received from a database master server, as described herein with reference to example embodiments. Database master servers and database replica servers may be collectively referred to as "database servers" or "database hosts". In some embodiments, a single database host may include components or resources of several distinct devices in communication over a network, such as distributed processing resources, distributed memory resources, and distributed storage resources in a cloud-based computing system.

In some aspects, the present disclosure describes a method for replaying, on a database host, an object queue comprising a plurality of write ahead log (WAL) records. The method comprises several steps. A B-tree representative of a structure of a database object is obtained. The B-tree comprises a plurality of branches, each branch comprising one or more blocks of the database object. A first WAL record of the object queue is processed to identify a first branch of the B-tree. The first branch of the B-tree comprises a first block of the database object to which the first WAL record applies. A second WAL record of the object queue is processed to identify a second branch of the B-tree. The second branch of the B-tree comprises a second block of the database object to which the second WAL record applies. On a processing device of the database host, a first process is executed to perform the following operations: in response to determining that the first branch is not locked, locking the first branch, and applying the first WAL record to the first block. On the processing device, a second process is executed to perform the following operations in parallel with the operations of the first process: in response to determining that the second branch is not locked, locking the second branch, and applying the second WAL record to the second block.

In some aspects, the present disclosure describes a database host, comprising a processing device, and a memory storing instructions. The instructions, when executed by the processing device, cause the database host to replay an object queue comprising a plurality of write ahead log (WAL) records. A B-tree representative of a structure of a database object is obtained. The B-tree comprises a plurality of branches, each branch comprising one or more blocks of the database object. A first WAL record of the object queue is processed to identify a first branch of the B-tree. The first branch of the B-tree comprises a first block of the database object to which the first WAL record applies. A second WAL record of the object queue is processed to identify a second branch of the B-tree. The second branch of the B-tree comprises a second block of the database object to which the second WAL record applies. On a processing device of the database host, a first process is executed to perform the following operations: in response to determining that the first branch is not locked, locking the first branch, and applying the first WAL record to the first block. On the processing device, a second process is executed to perform the following operations in parallel with the operations of the first process: in response to determining that the second branch is not locked, locking the second branch, and applying the second WAL record to the second block.

In some aspects, the present disclosure describes a computer-readable medium storing instructions thereon. The instructions, when executed by a processing device of a database host, cause the database host to replay an object queue comprising a plurality of write ahead log (WAL) records. A B-tree representative of a structure of a database object is obtained. The B-tree comprises a plurality of branches, each branch comprising one or more blocks of the database object. A first WAL record of the object queue is processed to identify a first branch of the B-tree. The first branch of the B-tree comprises a first block of the database object to which the first WAL record applies. A second WAL record of the object queue is processed to identify a second branch of the B-tree. The second branch of the B-tree comprises a second block of the database object to which the second WAL record applies. On a processing device of the database host, a first process is executed to perform the following operations: in response to determining that the first branch is not locked, locking the first branch, and applying the first WAL record to the first block. On the processing device, a second process is executed to perform the following operations in parallel with the operations of the first process: in response to determining that the second branch is not locked, locking the second branch, and applying the second WAL record to the second block.

In some examples, the method further comprises processing a third WAL record of the object queue to determine that the third WAL record applies to a third block in the first branch of the B-tree. The first process is executed to perform the following operations: in response to determining that the first branch is locked, maintaining the third WAL record in a sub-object queue until the first branch is not locked, and after determining that the first branch is no longer locked, locking the first branch and applying the third WAL record to the third block.

In some examples, the B-Tree further comprises a root node, and each branch of the B-Tree comprises a subtree depending from the root node.

In some examples, processing the first WAL record of the object queue to identify the first branch of the B-tree comprises identifying a key of the first WAL record, performing a binary search to compare the key to a plurality of root keys of the root node, each root key corresponding to a branch of the database object, and identifying the first branch based on the comparison.

In some examples, the method further comprises, in response to identifying the first branch, adding the first WAL record to a sub-object queue for the first branch. Determining that the first branch is not locked comprises determining that there are no other WAL records ahead of the first WAL record in the sub-object queue for the first branch.

In some examples, the database host comprises a database replica server.

In some examples, the method further comprises receiving the plurality of WAL records from a database master server.

In some examples, the method further comprises processing a further WAL record of the object queue to determine whether an operation specified by the further WAL record is a special operation. In response to determining that the operation specified by the further WAL record is a special operation, all other WAL records in the object queue having a lower log sequence number (LSN) than an LSN of the further WAL record are identified, and the identified WAL records of the object queue are applied to the database object. After the identified WAL records of the object queue have been applied to the database object, the further WAL record is applied to the database object.

In some examples, the special operation is an operation that affects multiple branches of the database object.

In some examples, the special operation is an operation that affects a root node of the database object.

In some examples, the method further comprises executing an object-level dispatcher process to select the plurality of WAL records from a larger set of WAL records based on a respective object identifier of each WAL record of the plurality of WAL records matching an object identifier associated with the database object, and assign the plurality of WAL records to the object queue. Processing the first WAL record of the object queue to identify the first branch of the B-tree comprises executing a sub-object-level dispatcher process to identify the first branch based on a sub-object identifier of the first WAL record matching a sub-object identifier of the first block, and in response to identifying the first branch, add the first WAL record to a sub-object queue for the first branch.

In some aspects, the present disclosure describes a computer-readable medium storing instructions thereon to be executed by a processing device of a database host. The instructions, when executed, cause the database host to perform the steps of one or more of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples in the context of distributed database systems. Although certain system diagrams and flowcharts are shown and discussed, these are provided as examples only and are not intended to be limiting.

Example Distributed Database System

FIG. 1 is a logical block diagram schematically illustrating a simplified distributed database system 100 that can deliver database services. In some examples, the distributed database system 100 may be implemented using a cloud-based (or cloud-native) database architecture or other distributed computing architecture.

The distributed database system 100 includes a database master server 110 and a database replica server 120. The database master server 110 receives database queries from various client applications, such as client 102. The database master server 110 is configured to receive CRUD queries 103, such as INSERT, UPDATE, and DELETE, that result in write operations on the database. In contrast, the database replica server 120 is configured to perform ROS to receive read-only queries 105, such as SELECT, from various client applications such as client 104.

When the DBMS 112 of the database master server 110 receives a CRUD query 103, the master database 116 is modified accordingly, and the change is written to the master WAL 114. The WAL records logging these changes are transmitted from the database master server 110 to the database replica server 120 as WAL records 107. The DBMS 122 of the database replica server 120 stores these WAL records 107 in its replica WAL 124 before replaying the WAL records 107 to update the replica database 126.

The client 104 querying the database replica server 120 will only receive consistent, up-to-date data if the DBMS 122 of the database replica server 120 has finished replaying the WAL records 107 to update the replica database 126. Thus, the speed with which the DBMS 122 of the database replica server 120 can complete replay of the received WAL records 107 is important to overall system performance. Furthermore, the time it takes for the database replica server 120 to complete replay of the received WAL records 107 is the minimum time before the database replica server 120 can take over operation as the primary database host in the event that the database master server 110 fails. Minimizing this time is therefore important to minimizing overall system downtime.

Example B-Tree

Figure 2:
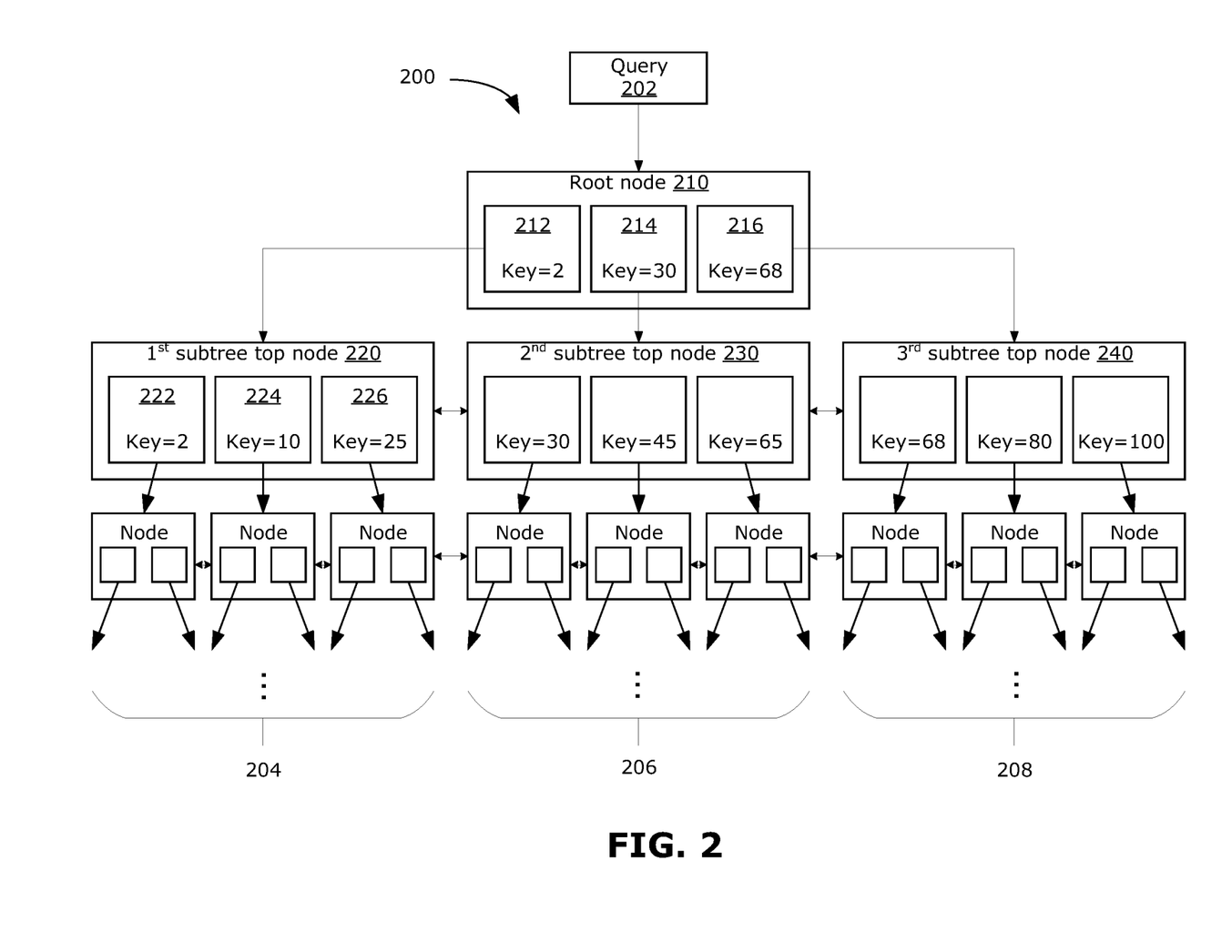
FIG. 2 is a block diagram schematically illustrating a B-Tree for indexing a database, in accordance with example embodiments described herein.

FIG. 2 is a block diagram showing a B-Tree 200 used to index a database object. In this example, the database object being indexed is a database table, and the B-Tree 200 indexes the database table by block number. The B-Tree 200 includes a root node 210 having three branches (i.e., subtrees) 204, 206, 208 depending from the root node 210. The three branches 204, 206, 208 are associated, respectively, with key 212 (having key value 2), key 214 (having key value 30), and key 216 (having key value 68) stored at the root node 210 (i.e., stored in a root block of the database object). Each branch 204, 206, 208 is therefore associated with a respective range of index values: branch 204 comprises index value range [2 to 29], branch 206 comprises index value range [30 to 67], and branch 208 comprises index value range [68 and higher].

In an example of an index scan operation using the B-Tree 200, a query 202 is received, requesting a read on a block in the database table having a key value of 27. The search starts with the root node 210, and an indexing process need to determine to which of the child nodes (and therefore branches 204, 206, or 208) to descend. Because 2≤27<30, the indexing process determines that the read is applicable to the first branch 204. The indexing process therefore visits the top node 220 of the first branch 204, which also has three keys 222 (having key value 2), 224 (having key value 10), and 226 (having key value 25). The operation repeats, determining that the further subtree linked from the third key 226 of the top node 220 should be traversed (because the third key 226 corresponds to key value 25, and 25<27). Each node of each subtree similarly has one or more keys, and the same process is repeated recursively until the indexing process reaches a leaf node mapped to key value 27.

In a further example, assume an "INSERT (key 45)" operation is executed on the database master server 110, and that the B-Tree 200 indexes a database table in the master database 116 on the database master server 110. The indexing process performs a binary search on the root node 210 of the B-Tree 200 and determines that key 45 should be inserted under branch 206 because 30≤45<68. The indexing process initializes data for performing the INSERT operation: the branch data for the operation is set to identify branch 206, and the LSN of the operation is set to the LSN of the root block storing the current root node 210. The minimum value in branch 206 is 30, and the maximum value is 68. (Anything greater than or equal to the maximum value will not be in this branch). During the actual INSERT operation, a WAL record is created, and the branch number and the root LSN are both written to the master WAL 114.

In this example, a replica copy of the B-Tree 200 is also used to index the corresponding table of the replica database 126 stored on the database replica server 120. After the database replica server 120 receives the WAL records 107, including the WAL record encoding the "INSERT (key 45)" operation, the DMBS 122 of the database replica server 120 uses its existing logic to determine if the "INSERT (key 45)" operation is a B-Tree record. If it is a B-Tree record, the branch information is extracted (i.e., identifying branch 206) and used to determine a specific queue of WAL records to which a dispatcher process should assign the WAL record for the "INSERT (key 45)" operation. Hence, unlike the "per page" approach that extracts the "page" number to perform dispatching of WAL records for replay, examples described herein extract the "branch" number from received WAL records instead. Examples of WAL record dispatching are described in greater detail below with reference to FIG. 6.

It will be appreciated that the root node LSN (log sequence number) may be encoded in the WAL records that apply to a database object indexed using the B-Tree 200. This information may be used to handle a special case. When a transaction (denoted TXN1) executed on the database master server 110 begins traversing the B-Tree 200 from the root node 210, it reads the current root node LSN (denoted LSN1). However, before TXN1 can complete its operation and write the WAL record with the branch number, another transaction (denoted TXN2) can modify the root node 210, thereby making the branch information of TXN1 stale. Techniques for handling this special case using a multi-level dispatching system are described below with reference to FIG. 6.

Example Database Host

Figure 3:
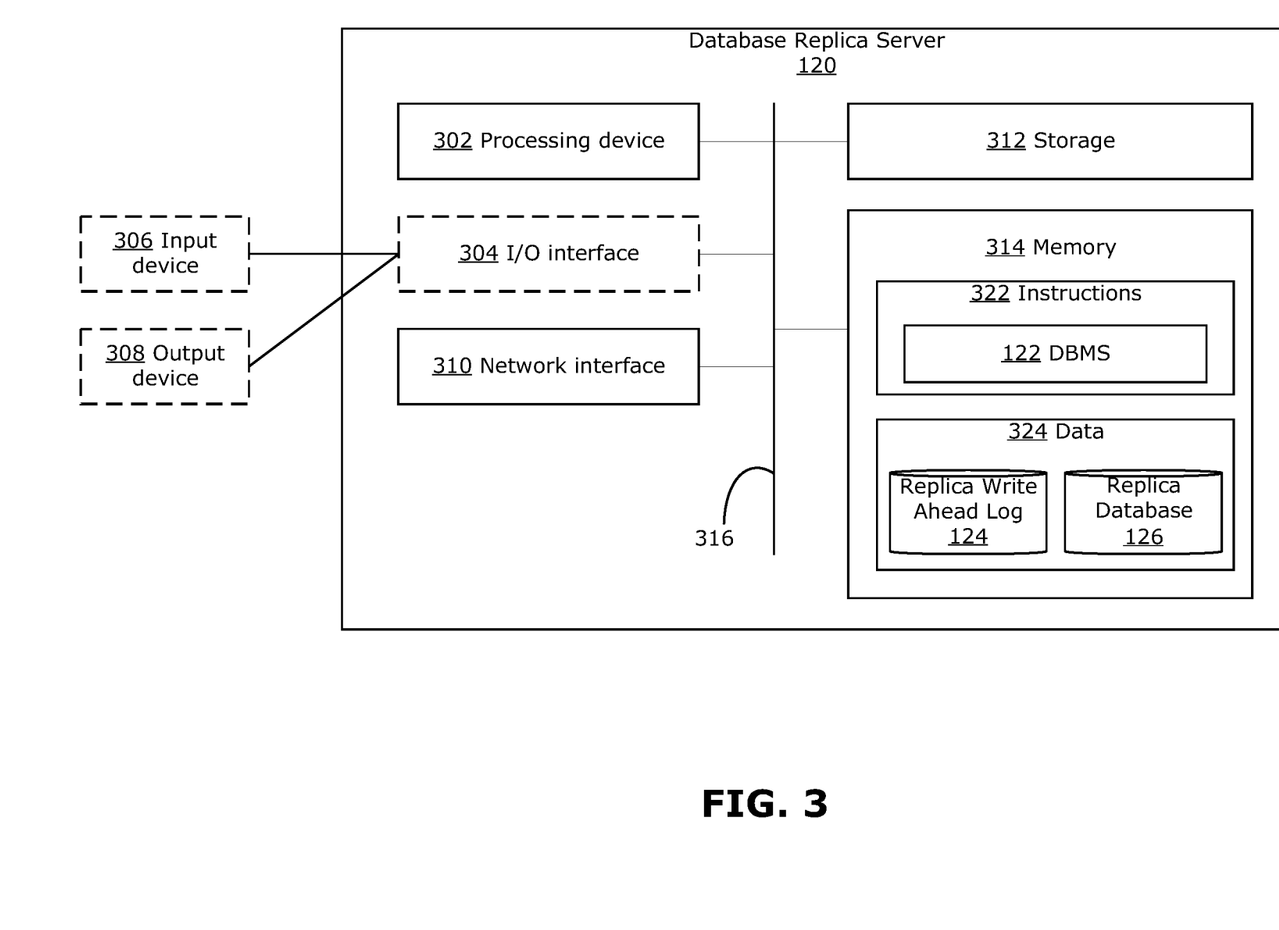
FIG. 3 is a block diagram illustrating a simplified example of a database replica server, in accordance with example embodiments described herein.

FIG. 3 is a block diagram illustrating a simplified example of a database host suitable for implementing example methods and systems described herein. The example database host is shown in FIG. 3 as example database replica server 120. In some examples, the database replica server 120 may be an illustration of a virtual machine provided by a cloud-based computing platform. Other examples suitable for implementing embodiments described in the present disclosure may be used, which may include components different from those discussed below. Although FIG. 3 shows a single instance of each component, there may be multiple instances of each component in the database replica server 120.

The database replica server 120 may include one or more processing devices 302, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The database replica server 120 may also include one or more optional input/output (I/O) interfaces 304, which may enable interfacing with one or more optional input devices 306 and/or optional output devices 308. The one or more processing devices 302, whether distributed or centralized in a location, may be referred to herein collectively as a "processing device" or a "processing system".

In the example shown, the input device(s) 306 (e.g., a keyboard, a mouse, a microphone, a touchscreen, and/or a keypad) and output device(s) 308 (e.g., a display, a speaker and/or a printer) are shown as optional and external to the database replica server 120. In other examples, there may not be any input device(s) 306 and output device(s) 308, in which case the I/O interface(s) 304 may not be needed.

The database replica server 120 may include one or more network interfaces 310 for wired or wireless communication with entities in the cloud-based database architecture. The network interface(s) 310 may include wired links (e.g., Ethernet cable) and/or wireless links (e.g., one or more antennas) for communications across the different layers components of the distributed database system 100.

The database replica server 120 may also include one or more storage units 312, which may include a mass storage unit such as a solid state drive, a hard disk drive, a magnetic disk drive and/or an optical disk drive.

The processing device 302 may include one or more memories 314, which may include a volatile or non-volatile memory (e.g., a flash memory, a random access memory (RAM), and/or a read-only memory (ROM)). The non-transitory memory(ies) 314 may store instructions 322 for execution by the processing device(s) 302, such as to carry out examples described in the present disclosure. For example, in the case where the database replica server 120 is used to implement a DBMS (shown as replica server DBMS 122), the memory(ies) 314 may store instructions for executing the functions of the DBMS 122 and for applying WAL records, as discussed further below.

The memory(ies) 314 may include other software instructions 322, such as for implementing an operating system and other applications/functions. In some examples, the database replica server 120 may additionally or alternatively execute instructions from an external memory (e.g., an external drive in wired or wireless communication with the database replica server 120) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The memory(ies) 314 may also store data 324, such as the replica WAL 124 and the replica database 126. In some examples, the replica database 126 includes one or more B-Tree indices 200 stored in blocks of the database, such as one B-Tree index for each database table indexed using B-Tree techniques. Thus, some blocks of the replica database 126 store table data (corresponding to a database table object), and some blocks of the replica database 126 store index data, such as B-Tree index data (corresponding to an index object).

In some examples, the replica WAL 124 and replica database 126 may be written from memory 314 to storage 312, and/or retrieved from storage 312 to memory 314, at various times, in accordance with known techniques for WAL and database storage.

The database replica server 120 may also include a bus 316 providing communication among components of the database replica server 120, including those components discussed above. The bus 316 may be any suitable bus architecture including, for example, a memory bus, a peripheral bus or a video bus. In some examples, the components of the database replica server 120 are distributed across a network, and communicate with each other via the network interface 310.

Example Method for Applying WAL Records

Figure 4:
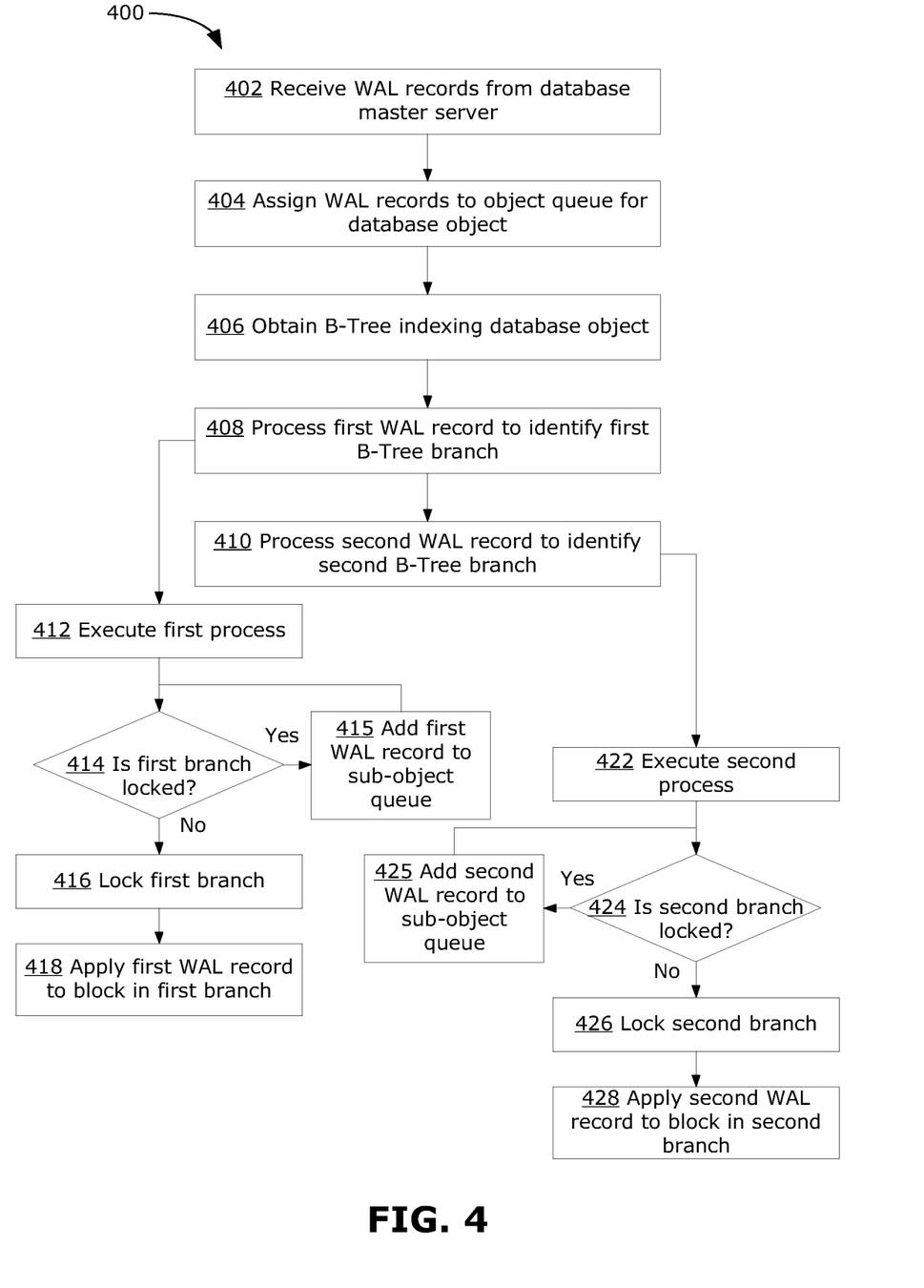
FIG. 4 is a flowchart illustrating an example method for replaying WAL records on a database host, in accordance with example embodiments described herein.

FIG. 4 illustrates an example method 400 for replaying, on a database host (such as database replica server 120), an object queue comprising a plurality of WAL records.

At 402, WAL records 107 are obtained from a database master server 110, as described above with reference to FIG. 1.

At 404, one or more of the received WAL records are assigned to an object queue for a specific database object of the replica database 126, such as a table or an index of the database. In some embodiments, the received WAL records may be dispatched to the object queue by a multi-level dispatching system as described below with reference to FIGS. 6-7.

At 406, a B-tree 200 is obtained. In some examples, the B-Tree 200 is maintained by the database replica DBMS 122 as part of the replica database 126. The B-Tree 200 may be maintained to replicate the state of the B-Tree used by the master database 116. As described above with reference to FIG. 2, the B-Tree 200 is representative of a structure of the database object and includes a plurality of branches, each branch corresponding to (e.g., pointing to or including) one or more blocks of the database object.

At 408, a first WAL record of the object queue is processed to identify a first branch of the B-tree (e.g., middle branch 206). In some examples, the first WAL record is processed by a dispatcher process to identify a sub-object identifier, such as a block identifier or a branch identifier. Based on the sub-object identifier, the sub-object dispatcher process determines that the first WAL record applies to a first branch of the B-tree 200.

In some examples, this determination is made based on the sub-object identifier of the first WAL record identifying a first block that is included in the first branch, wherein the operation specified by the first WAL record is intended to be applied to the first block. In some examples, the sub-object identifier is used as the key and compared to the keys of the root node 210 of the B-Tree 200 using a binary search algorithm, as described above with reference to FIG. 2, to determine which branch of the B-Tree 200 the WAL record applies to. In some examples, the sub-object identifier directly indicates a branch number (e.g., it directly identifies branch 204, 206, or 208). Some embodiments may use more than one type of sub-object identifier: for example, in the example multi-level dispatching system described below with reference to FIGS. 6-7, a WAL record applicable to a block uses the block number as its sub-object identifier, whereas a WAL record applicable to an index uses the branch number as its sub-object identifier.

In response to determining that the first WAL record applies to the first branch, a first process is executed to apply the first WAL record. In some embodiments, the first process may run in parallel with the process used to identify branches for each WAL record in the object queue (e.g., the sub-object dispatcher process). The operations of the first process are described below at steps 412 through 418. In some embodiments, therefore, step 410 may be performed in parallel with steps 412 through 418.

At 410, a second WAL record of the object queue is processed to identify a second branch of the B-tree distinct from the first branch (e.g., left branch 204), as at step 408 above. In some examples, this determination is made based on the sub-object identifier of the second WAL record identifying a second block that is included in the second branch, wherein the operation specified by the second WAL record is intended to be applied to the second block.

In response to determining that the second WAL record applies to the second branch, a second process is executed to apply the second WAL record. The second process runs in parallel with the first process, such that both processes may operate in parallel to apply WAL records to both branches. In some embodiments, the first process may also run in parallel with the process used to identify branches for each WAL record in the object queue (e.g., the sub-object dispatcher process). The operations of the second process are described below at steps 422 through 428.

At 412, the first process is executed to apply the first WAL record by performing steps 414 through 418.

At 414, the first process determines whether the first branch is locked. In some embodiments, a branch is locked if there are other WAL records queued ahead of the current WAL record in the sub-object queue for the branch. In some embodiments, a branch may be locked by setting a data bit or other indicator, and the state of the data bit may be checked to determine whether the branch is locked.

If the first branch is locked, at 415 the first process assigns the first WAL record to a sub-object queue for the first branch and waits for the first branch to be unlocked.

If the first branch is not locked, at 416 the first process locks the first branch and proceeds to 418. In some embodiments, the first branch may be locked by maintaining a queue of WAL records; only the record at the front of the queue can be written to the first branch, and the second and subsequent WAL records in the queue must wait until the WAL record at the front of the queue has been processed and removed from the queue, at which point the second WAL record in the queue can be applied. The step of locking the branch can be implemented by any means that ensures that only a single WAL record is written to the branch at a time.

At 418, the first process applies the first WAL record. In some examples, the first WAL record is applied to the first block, i.e., the block indicated by its sub-object identifier as the target block to which its operation is applicable.

Steps 422 through 428, performed by the second process, operate analogously to steps 412 through 418, but using the second WAL record and second branch. Thus, at 422, the second process is executed to apply the second WAL record by performing steps 424 through 428.

At 424, the second process determines whether the second branch is locked, as at step 414.

If the first branch is locked, at 425 the second process assigns the second WAL record to a sub-object queue for the second branch and waits for the second branch to be unlocked.

If the second branch is not locked, at 426 the second process locks the second branch and proceeds to 428.

At 428, the second process applies the second WAL record.

Figure 5:
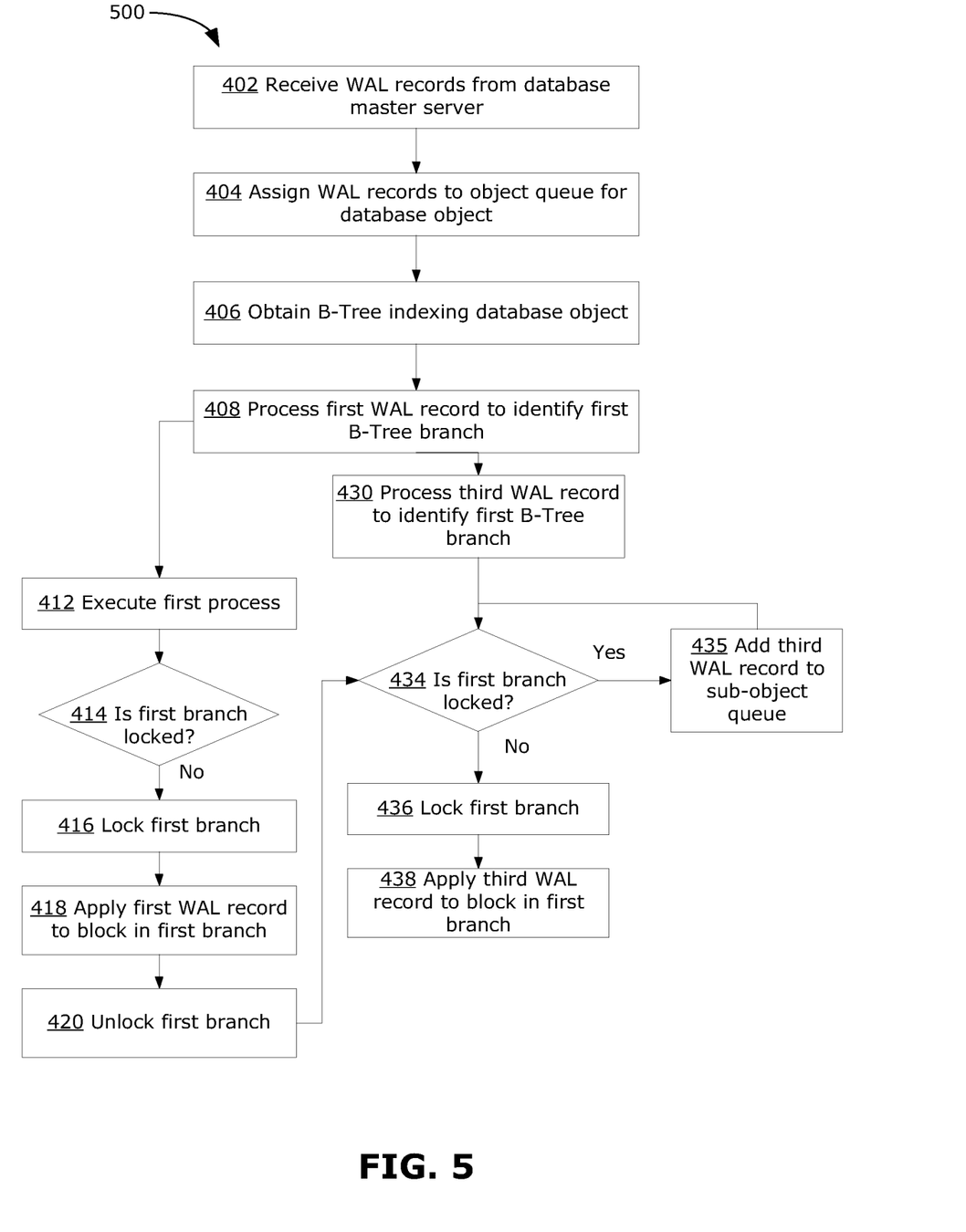
FIG. 5 is a flowchart illustrating an example method for replaying an object queue comprising a plurality of WAL records, wherein two WAL records in the object queue apply to the same branch of a B-Tree, in accordance with example embodiments described herein.

FIG. 5 illustrates a further example method 500 for replaying an object queue comprising a plurality of WAL records, wherein two WAL records in the object queue apply to the same branch of the B-Tree 200. Steps 402 through 408, and steps 412 through 418 performed by the first process, are identical to the same steps in method 400 of FIG. 4.

However, after step 408, method 500 proceeds to step 430, at which a third WAL record is processed to identify that it applies to the first branch of the B-Tree 200 (i.e., the same branch as the first WAL record being applied by the first process). In response to determining that the third WAL record applies to the first branch, the first process is used to apply the third WAL record, starting at step 434.

At 434, as at step 414, the first process checks whether the first branch is locked. If the first branch is locked (for example, because the first process is still applying the first WAL record at step 418), then at step 435 the first process assigns the third WAL record to the sub-object queue for the first branch and waits for the first branch to become unlocked.

When the first process finishes applying the first WAL record at step 418, it proceeds to unlock the first branch at step 420.

Thus, if step 420 has already been performed when the first process executes step 434, and the first branch is determined to be unlocked, the method 500 proceeds to 436.

At 436, the first process locks the first branch, as at step 416.

At 438, the first process applies the third WAL record to the first branch (e.g., to a third block residing in the first branch, as indicated by the sub-object identifier of the third WAL record).

Thus, branch-level locking is used to synchronize WAL records applicable to the branch, in order to ensure consistency as WAL records are applied to the branch or its constituent blocks. Because all operations within the same branch are serialized, ROS will be consistent because the index structure will always be valid at any point in time during replay. In some examples, the set of rows (i.e. database records) will always be a superset of valid rows, and the existing multi version concurrency control (MVCC) checking still decides which rows are visible. Multi block operations within the same branch, such as SPLIT, may be serialized, hence keeping the validity of the index structure.

Example Multi-Level Dispatching System

Figure 6:
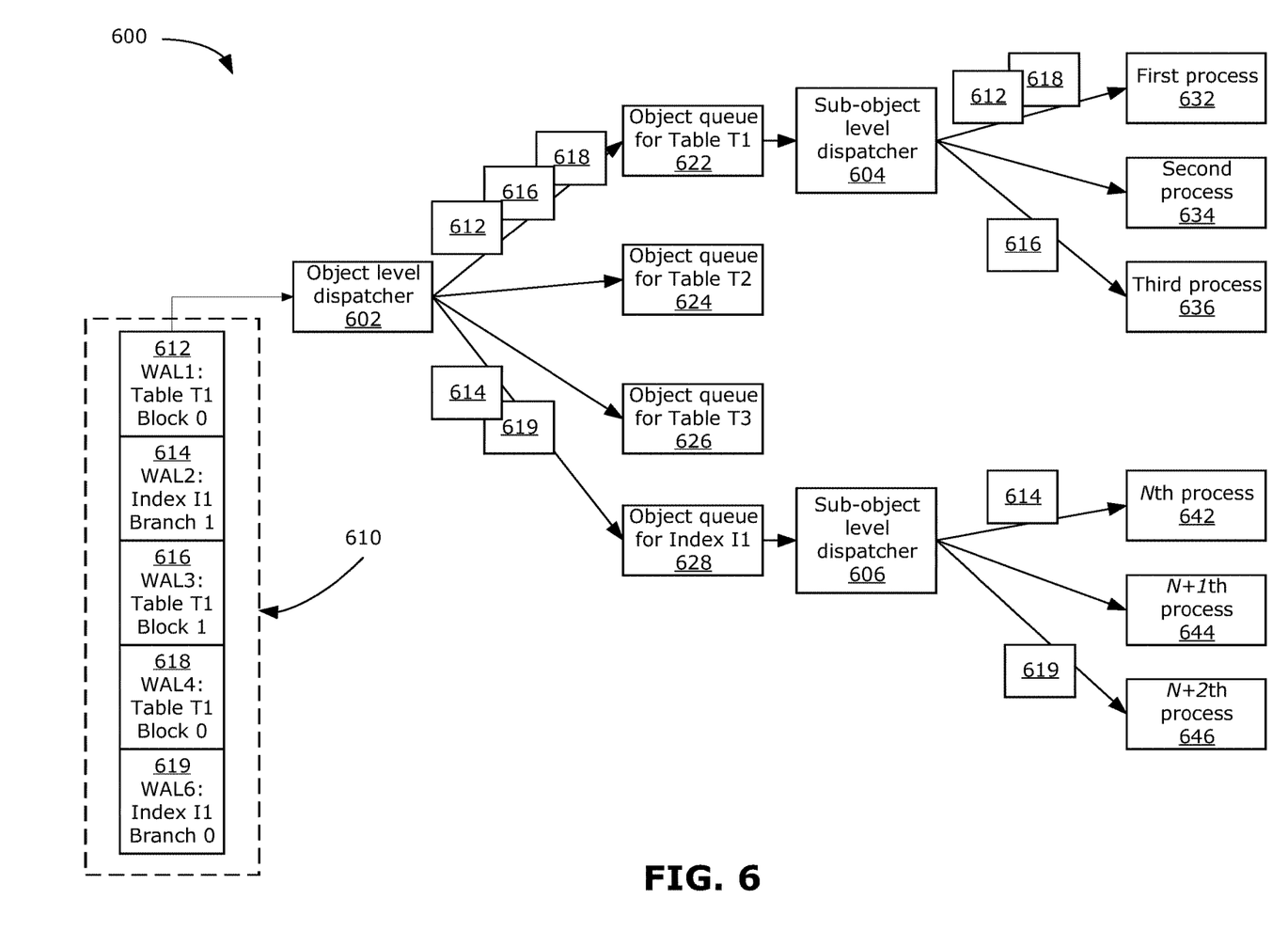
FIG. 6 is a block diagram showing a multi-level WAL record dispatching system, in accordance with example embodiments described herein.

FIG. 6 illustrates a multi-level WAL record dispatching system 600.

In some cases, a WAL record may be received that specifies a special operation requiring a global synchronization of queued WAL records, for example because the special operation affects multiple branches 204, 206, 208 or the root node 210. For example, a SPLIT operation where the right neighbor is in another branch would necessarily involve modification of both branches. In some embodiments, a multi-level dispatching system 600 may be used to ensure that special operations affecting a root node or multiple branches of a single database object do not need to delay the application of WAL records applicable to other database objects. It will be appreciated that, in some examples, two or more database objects (such as two indices of the database) may be mapped to a single object queue; in such cases, all objects mapped to the single object queue would be effectively locked while a global synchronization is performed on any of the other such objects. However, each database object queue can continue to apply WAL records independently of the other object queues.

The multi-level dispatching system 600 uses an object-level dispatcher process 602 to dispatch received WAL records to the respective, and uses multiple sub-object level dispatcher processes 604, 606 to dispatch received WAL records to the respective branch of the B-Tree 200. In the illustrated example, a set 610 of WAL records are received from a database master server 110 and need to be applied to the replica database 126 by the DBMS 122 of the database replica server 120. In some embodiments, the multi-level dispatching system 600 may be implemented as part of the replica server DBMS 122.

The WAL records to be dispatched are WAL1 612 (identifying object Table T1, sub-object Block 0); WAL2 614 (identifying object Index I1, sub-object Branch 1); WAL3 616 (identifying object Table T1, sub-object Block 1); WAL4 618 (identifying object Table T1, sub-object Block 0); and WAL5 619 (identifying object Index I1, sub-object Branch 0). It will be appreciated that table numbers, index numbers, block numbers, and branch numbers have been simplified for this example.

In operation, the object level dispatcher process 602 parses each WAL record in the set 610 and extracts its object identifier. Based on its object identifier, the WAL record is dispatched to an object queue: thus, WAL1 612, WAL3 616 and WAL4 618 are dispatched to the object queue 622 for Table T1, whereas WAL2 614 and WAL5 619 are dispatched to the object queue 628 for Index I1. A separate object queue is implemented for each database object: FIG. 6 shows an object queue 624 for a second table T2, and an object queue 626 for a third table T3.

Each object queue 622, 624, 626, 628 is managed by a respective sub-object level dispatcher process. The sub-object level dispatcher process 604 for Table T1 processes each WAL record in its object queue 622 to extract a sub-object identifier (as described with reference to method 400 of FIG. 4) in order to dispatch the WAL record to a respective sub-object queue: as shown, WAL1 612 and WAL4 618, having sub-object identifiers indicating block 0, are dispatched to a sub-object queue for the B-Tree branch that includes block 0, managed by first process 632 (i.e., a worker thread), and WAL3 616, having a sub-object identifier indicating block 1, is dispatched to a sub-object queue for the B-Tree branch that includes block 1, managed by third process 636. A second process 634 is also shown: in some examples, a separate worker thread is used to manage each sub-object queue (e.g., one worker thread for each B-Tree branch).

In the illustrated example, the sub-object level dispatcher processes for table objects (such as dispatcher 604 for Table T1) extract block numbers as sub-object identifiers, whereas the sub-object level dispatchers for index objects (such as dispatcher 606 for Index I1) extract branch numbers as sub-object identifiers. Thus, sub-object level dispatcher process 606 for Index I1 processes the WAL records in object queue 628 for Index I1 to extract a branch number as the sub-object identifier. Each WAL record in the object queue 628 is then dispatched to a respective sub-object queue: WAL2 614, having a sub-object identifier indicating branch 1, is dispatched to a sub-object queue for branch 1, managed by Nth process 642, and WAL5 614, having a sub-object identifier indicating branch 0, is dispatched to a sub-object queue for branch 0, managed by N+2th process 646. An N+1th process 644 is also shown, for managing the sub-object queue for a third B-Tree branch. It will be appreciated that some examples will have more or fewer than 3 branches and therefore more or fewer than 3 processes for managing the sub-object queues for each object.

Example Method for Multi-Level Dispatching of WAL Records

Figure 7:
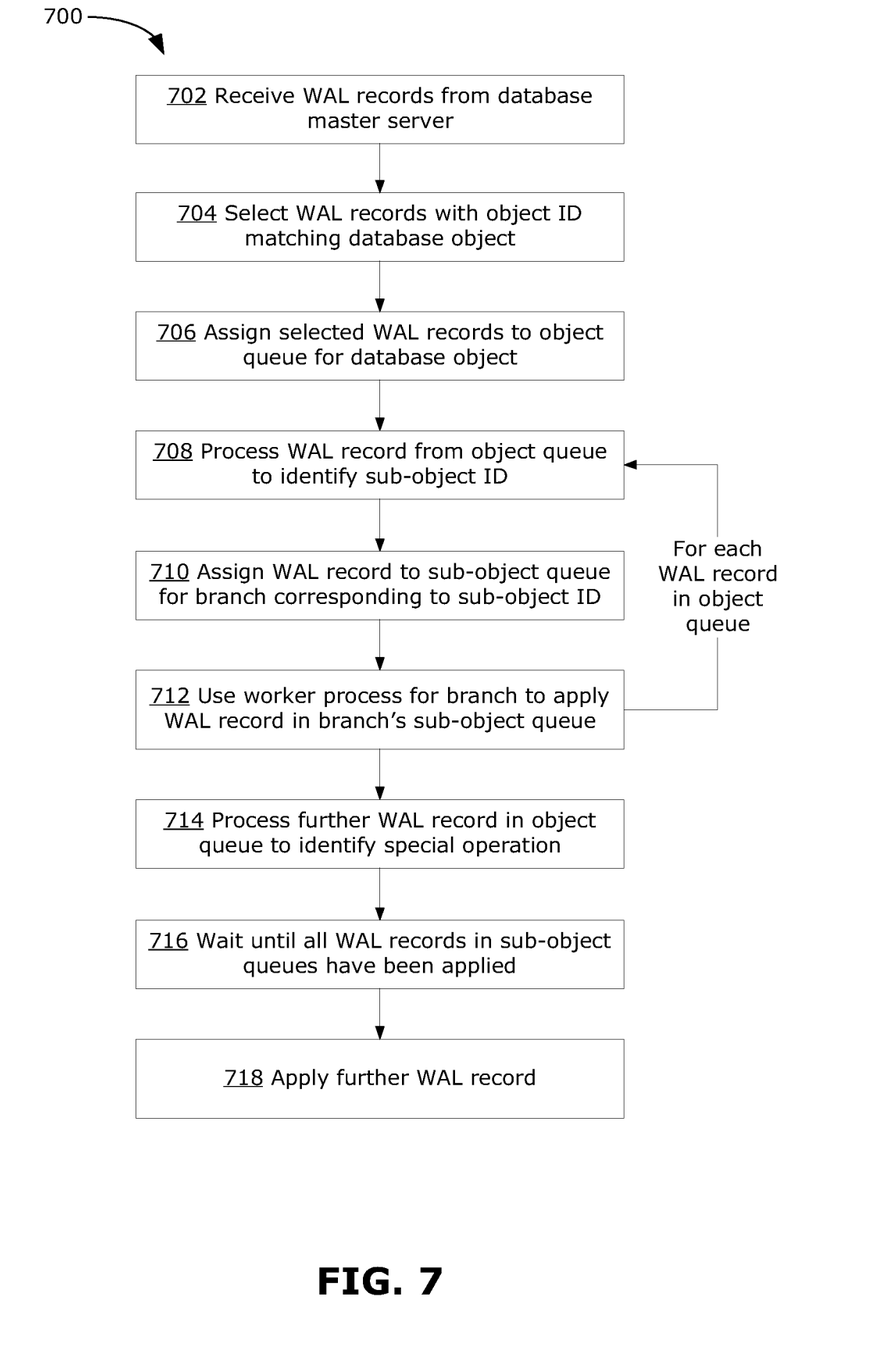
FIG. 7 is a flowchart illustrating an example method for applying WAL records, using the multi-level dispatching system of FIG. 6

FIG. 7 illustrates an example method 700 for applying WAL records, using the multi-level dispatching system 600 of FIG. 6.

At 702, WAL records are received from the database master server 110, as in method 400.

At 704, the object-level dispatcher process 602 selects WAL records having object identifiers matching a given database object (e.g., Table T1). This match may be performed, e.g., by hashing the object identifier of the WAL record, thereby matching it to the hashed object ID of the database object. The plurality of WAL records with object identifiers matching the database object (e.g., WAL1 612, WAL 3 616, and WAL4 618) are therefore selected from a larger set of WAL records, i.e., the set 610 received from the master database server 110.

At 706, the selected WAL records are assigned to the object queue for the database object (e.g., object queue 622 for Table T1).

At 708, the sub-object level dispatcher process for the database object (e.g., sub-object level dispatcher 604 for Table T1) processes the WAL records in the object queue (e.g., object queue 622) to identify which branch of the B-Tree 200 the WAL record applies to. In some embodiments, step 708 is performed by extracting a sub-object identifier, such as a block number or branch number as described above with reference to FIG. 6. The extracted sub-object identifier of the WAL record is then compared to a sub-object identifier of the database's sub-objects, e.g., by hashing the sub-object identifiers. In examples using block numbers as sub-object identifiers, the binary search operation described above with reference to FIG. 2 is performed to determine which branch of the B-Tree 200 the WAL record applies to.

At 710, in response to identifying the B-Tree branch to which the WAL applies, the WAL record is assigned or added to a sub-object queue for that branch.

At 712, a worker process (such as first process 632) for the applicable branch is used to apply the WAL record, according to its position in the sub-object queue for the branch.

Steps 708 through 712 are repeated continuously to process, assign, and apply each WAL record in the object queue.

In some cases, a WAL record may specify a special operation that requires a global synchronization. Special operations may include operations that modify the root node 210, or operations that change more than one branch of the B-Tree 200. These special operations cannot be executed in parallel at the branch level, because they implicate multiple branches of a B-Tree indexing a database object. In conventional approaches supporting ROS, a single-level dispatcher, operating at the level of the entire database, dispatches WAL records to be applied. In such a conventional approach, a global synchronization would require that all WAL records received by the database replica server 120 ahead of the special operation (e.g., all WAL records in the set 610) be completed before the special operation can be executed; thus, all parallel processes applying WAL records throughout the entire database would need to complete, and then the special operation would need to be performed by a single process before parallelism could be resumed. This would typically introduce significant delays every time a WAL record indicating a special operation was received. However, by using the multi-level dispatching system 600, examples described herein can perform a global synchronization at the database object level instead of at the database level, thereby allowing concurrent application of WAL records to different database objects that are not targeted by the special operation.

Thus, at 714, a further WAL record encoding a special operation is processed by the sub-object level dispatcher process (e.g., dispatcher 604 for Table T1), and the special operation is identified.

At 716, a global synchronization of the database object (e.g., Table T1) is performed. Dispatching of WAL records is paused while all sub-object queues are drained by their respective worker processes (e.g., processes 632, 634, and 636). The sub-object dispatcher process waits for all sub-object queues to be drained before handling the special operation of the further WAL record. In some embodiments, a sub-object queue is drained by applying all WAL records in the sub-object queue having a lower log sequence number (LSN) than the LSN of the further WAL record (i.e., the WAL record encoding the special operation).

At 718, after the sub-object queues for the database object (e.g., for Table T1) are drained (i.e., the sub-object queue contains no WAL records having a lower LSN than the further WAL record) because their respective worker processes (e.g., 632, 634, 636) have applied all such queued WAL records, the further WAL record is applied to perform the special operation. For example, the special operation may be executed to change the root node 210 or to change blocks or index values of multiple branches of the B-Tree 200.

After the special operation has been applied at step 718, operation continues as normal, with multi-level dispatching and parallel application of WAL records at the branch level.

Thus, by using the multi-level dispatching system 600, a global synchronization only needs to be applied at the database object level, allowing concurrent application of WAL records to other database objects, as well as concurrent dispatching of additional WAL records to the object queue to the locked database object.

In some embodiments the multi-level dispatching system 600 may use LSN information encoded in WAL records to handle a special case in which concurrent transactions modify a root node LSN. When a first transaction (denoted TXN1) executed on the database master server 110 begins traversing the B-Tree 200 from the root node 210, it reads the current root node LSN (denoted LSN1). However, before TXN1 can complete its operation and write the WAL record with the branch number, another transaction (denoted TXN2) can modify the root node 210, thereby making the branch information of TXN1 stale.

To detect this special case, the root node LSN may be used in some embodiments as an epoch check during WAL replay. If TXN2 finishes before TXN1, then TXN2 would have to associate the root node with a higher LSN than the LSN read by TXN1. Thus, if TXN1 reads LSN1 as the root node LSN, then TXN2 would need to associate LSN2 with the root node (i.e., update the root node LSN to LSN2). In addition, during replay at the database replica server 120, WAL records created to encode TXN2 would be dispatched before WAL records created to encode TXN1.

During replay, the dispatcher (e.g., sub-object level dispatcher 604) processes the WAL record encoding TXN2 first. The dispatcher determines that TXN2 encodes an operation that modifies the root node 210, and determines that the LSN for TXN2 is LSN2. Later, during dispatch of TXN1, the dispatcher determines that the root node LSN of TXN1 is LSN1, which is less than the current root page LSN for the Index (i.e., LSN1<LSN2). When the dispatcher detects this scenario, it is treated as a special operation, and a global synchronization is triggered, as described above. This maintains the validity of the Index.

Experimental Results

Experimental tests have been performed to compare the performance of the techniques described herein (namely, branch-level locking and multi-level dispatching) against conventional "per object" and "per block" approaches. Benchmark TPC-C was executed with the following configuration: 1000 warehouses, 800 clients, 30 minutes run, 1 Primary database host, and 1 Standby database host.

On the standby host, the "per object" approach was configured to use 20 replay worker processes, which means that 20 threads were allowed to replay WAL records concurrently. (Note that 20 threads is the maximum number supported by the "per object" approach.) Both the "per block" approach and the approach described herein were configured to use 64 threads, i.e., 64 worker processes.

The replay speed on the standby host was markedly improved in the presently-described approach compared to the existing approaches. The presently-described approach was able to replay 142 million LSNs per second, whereas the "per object" approach could only replay 48 million LSNs per second, and the "per block" approach could only replay 102 million LSNs per second.

The maximum speed of the primary host that the standby host could support was also significantly improved. The maximum speed refers to how fast (or slow) the primary host should be generating and sending WAL records in order for the standby host to be able to replay the WAL records within a reasonable time. The faster the primary host is generating WAL records within a period of time, the more WAL records are being sent to the standby host during that period of time.

In tests, the presently-described approach achieved a maximum speed of approximately 1.1 million TPMc according to the TPMc benchmark, whereas the "per object" approach only achieved 800,000 TPMc and the "per block" approach only achieved approximately 370,000 TPMc. (It will be appreciated that the slowness of the "per block" approach is due at least in part to its higher overhead of dispatching logic.)

In light of these experimental findings, it will be appreciated that the examples described herein may be used in some embodiments to achieve significantly improved throughput of WAL record application, as well as significantly improved maximum speed of the master database server, in a distributed database system.

GENERAL

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. In general, the software improves the operation of the hardware in one or more ways.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for replaying, on a database host, an object queue comprising a plurality of write ahead log (WAL) records, the method comprising:
    obtaining a B-tree representative of a structure of a database object, the B-tree comprising a plurality of branches, each branch comprising one or more blocks of the database object;
    processing a first WAL record of the object queue to identify a first branch of the B-tree, the first branch of the B-tree comprising a first block of the database object to which the first WAL record applies;
    processing a second WAL record of the object queue to identify a second branch of the B-tree, the second branch of the B-tree comprising a second block of the database object to which the second WAL record applies;
    executing, on a processing device of the database host, a first process to perform the following operations:
        in response to determining that the first branch is not locked:
            locking the first branch; and
            applying the first WAL record to the first block; and
    executing, on the processing device, a second process to perform the following operations in parallel with the operations of the first process:
        in response to determining that the second branch is not locked:
            locking the second branch; and
            applying the second WAL record to the second block.

2. The method of claim 1, further comprising:
    processing a third WAL record of the object queue to determine that the third WAL record applies to a third block in the first branch of the B-tree; and
    executing the first process to perform the following operations:
        in response to determining that the first branch is locked:
            maintaining the third WAL record in a sub-object queue until the first branch is not locked; and
            after determining that the first branch is no longer locked:
                locking the first branch; and
                applying the third WAL record to the third block.

3. The method of claim 1, wherein:
the B-Tree further comprises a root node; and
each branch of the B-Tree comprises a subtree depending from the root node.

4. The method of claim 3, wherein:
processing the first WAL record of the object queue to identify the first branch of the B-tree comprises:
    identifying a key of the first WAL record;
    performing a binary search to compare the key to a plurality of root keys of the root node, each root key corresponding to a branch of the database object; and
    identifying the first branch based on the comparison.

5. The method of claim 1:
further comprising, in response to identifying the first branch, adding the first WAL record to a sub-object queue for the first branch;
wherein determining that the first branch is not locked comprises:
    determining that there are no other WAL records ahead of the first WAL record in the sub-object queue for the first branch.

6. The method of claim 1, wherein:
the database host comprises a database replica server.

7. The method of claim 6, further comprising:
receiving the plurality of WAL records from a database master server.

8. The method of claim 1, further comprising:
processing a further WAL record of the object queue to determine whether an operation specified by the further WAL record is a special operation; and
in response to determining that the operation specified by the further WAL record is a special operation:
    identifying all other WAL records in the object queue having a lower log sequence number (LSN) than an LSN of the further WAL record;
    applying the identified WAL records of the object queue to the database object; and
    after the identified WAL records of the object queue have been applied to the database object, applying the further WAL record to the database object.

9. The method of claim 8, wherein:
the special operation is an operation that affects multiple branches of the database object.

10. The method of claim 8, wherein:
the special operation is an operation that affects a root node of the database object.

11. The method of claim 8:
further comprising executing an object-level dispatcher process to:
    select the plurality of WAL records from a larger set of WAL records based on a respective object identifier of each WAL record of the plurality of WAL records matching an object identifier associated with the database object; and assign the plurality of WAL records to the object queue; and wherein processing the first WAL record of the object queue to identify the first branch of the B-tree comprises executing a sub-object-level dispatcher process to:
identify the first branch based on a sub-object identifier of the first WAL record matching a sub-object identifier of the first block; and
in response to identifying the first branch, add the first WAL record to a sub-object queue for the first branch.

12. A database host, comprising:
a processing device; and
a memory storing instructions that, when executed by the processing device, cause the database host to replay an object queue comprising a plurality of write ahead log (WAL) records by:
obtaining a B-tree representative of a structure of a database object, the B-tree comprising a plurality of branches, each branch comprising one or more blocks of the database object;
processing a first WAL record of the object queue to identify a first branch of the B-tree, the first branch of the B-tree comprising a first block of the database object to which the first WAL record applies;
processing a second WAL record of the object queue to identify a second branch of the B-tree, the second branch of the B-tree comprising a second block of the database object to which the second WAL record applies;
executing, on a processing device of the database host, a first process to perform the following operations:
in response to determining that the first branch is not locked:
locking the first branch; and
applying the first WAL record to the first block; and
executing, on the processing device, a second process to perform the following operations in parallel with the operations of the first process:
in response to determining that the second branch is not locked:
locking the second branch; and
applying the second WAL record to the second block.

13. The database host of claim 12, wherein the instructions, when executed by the processing device, further cause the database host to:
process a third WAL record of the object queue to determine that the third WAL record applies to a third block in the first branch of the B-tree; and
execute the first process to perform the following operations:
in response to determining that the first branch is locked:
maintaining the third WAL record in a sub-object queue until the first branch is not locked; and
after determining that the first branch is no longer locked:
locking the first branch; and
applying the third WAL record to the third block.

14. The database host of claim 12, wherein:
the instructions, when executed by the processing device, further cause the database host to:
in response to identifying the first branch, add the first WAL record to a sub-object queue for the first branch; and
determining that the first branch is not locked comprises:
determining that there are no other WAL records ahead of the first WAL record in the sub-object queue for the first branch.

15. The database host of claim 12, wherein:
the database host comprises a database replica server.

16. The database host of claim 15, wherein the instructions, when executed by the processing device, further cause the database host to:
receive the plurality of WAL records from a database master server.

17. The database host of claim 12, wherein the instructions, when executed by the processing device, further cause the database host to:
process a further WAL record of the object queue to determine whether an operation specified by the further WAL record is a special operation; and
in response to determining that the operation specified by the further WAL record is a special operation:
identify all other WAL records in the object queue having a lower log sequence number (LSN) than an LSN of the further WAL record;
apply the identified WAL records of the object queue to the database object; and
after the identified WAL records of the object queue have been applied to the database object, apply the further WAL record to the database object.

18. The database host of claim 17, wherein:
the special operation is:
an operation that affects multiple branches of the database object; or
an operation that affects a root node of the database object.

19. The database host of claim 17, wherein:
the instructions, when executed by the processing device, further cause the database host to:
execute an object-level dispatcher process to:
select the plurality of WAL records from a larger set of WAL records based on a respective object identifier of each WAL record of the plurality of WAL records matching an object identifier associated with the database object; and
assign the plurality of WAL records to the object queue; and
processing the first WAL record of the object queue to identify the first branch of the B-tree comprises executing a sub-object-level dispatcher process to:
identify the first branch based on a sub-object identifier of the first WAL record matching a sub-object identifier of the first block; and
in response to identifying the first branch, add the first WAL record to a sub-object queue for the first branch.

20. A non-transitory computer-readable medium storing instructions thereon, the instructions, when executed by a processing device of a database host, causing the database host to replay an object queue comprising a plurality of write ahead log (WAL) records by:
obtaining a B-tree representative of a structure of a database object, the B-tree comprising a plurality of branches, each branch comprising one or more blocks of the database object;
processing a first WAL record of the object queue to identify a first branch of the B-tree, the first branch of the B-tree comprising a first block of the database object to which the first WAL record applies;

processing a second WAL record of the object queue to identify a second branch of the B-tree, the second branch of the B-tree comprising a second block of the database object to which the second WAL record applies;

executing, on a processing device of the database host, a first process to perform the following operations:
in response to determining that the first branch is not locked:
locking the first branch; and
applying the first WAL record to the first block; and executing, on the processing device, a second process to perform the following operations in parallel with the operations of the first process:
in response to determining that the second branch is not locked:
locking the second branch; and
applying the second WAL record to the second block.

\* \* \* \* \*